Figure 9:
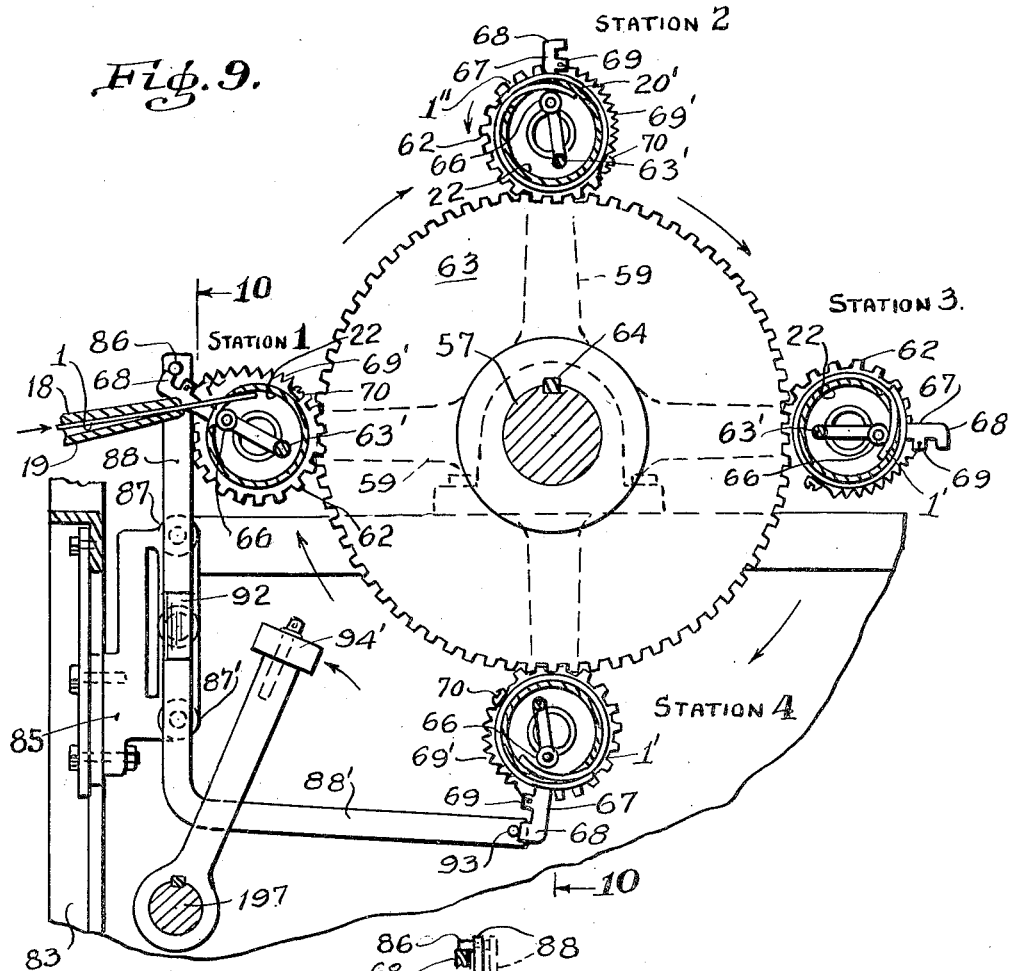

Aug. 20, 1957  O. M. CLINTON  2,803,175
CARTON LINING MACHINE
Filed April 5, 1954  9 Sheets-Sheet 1
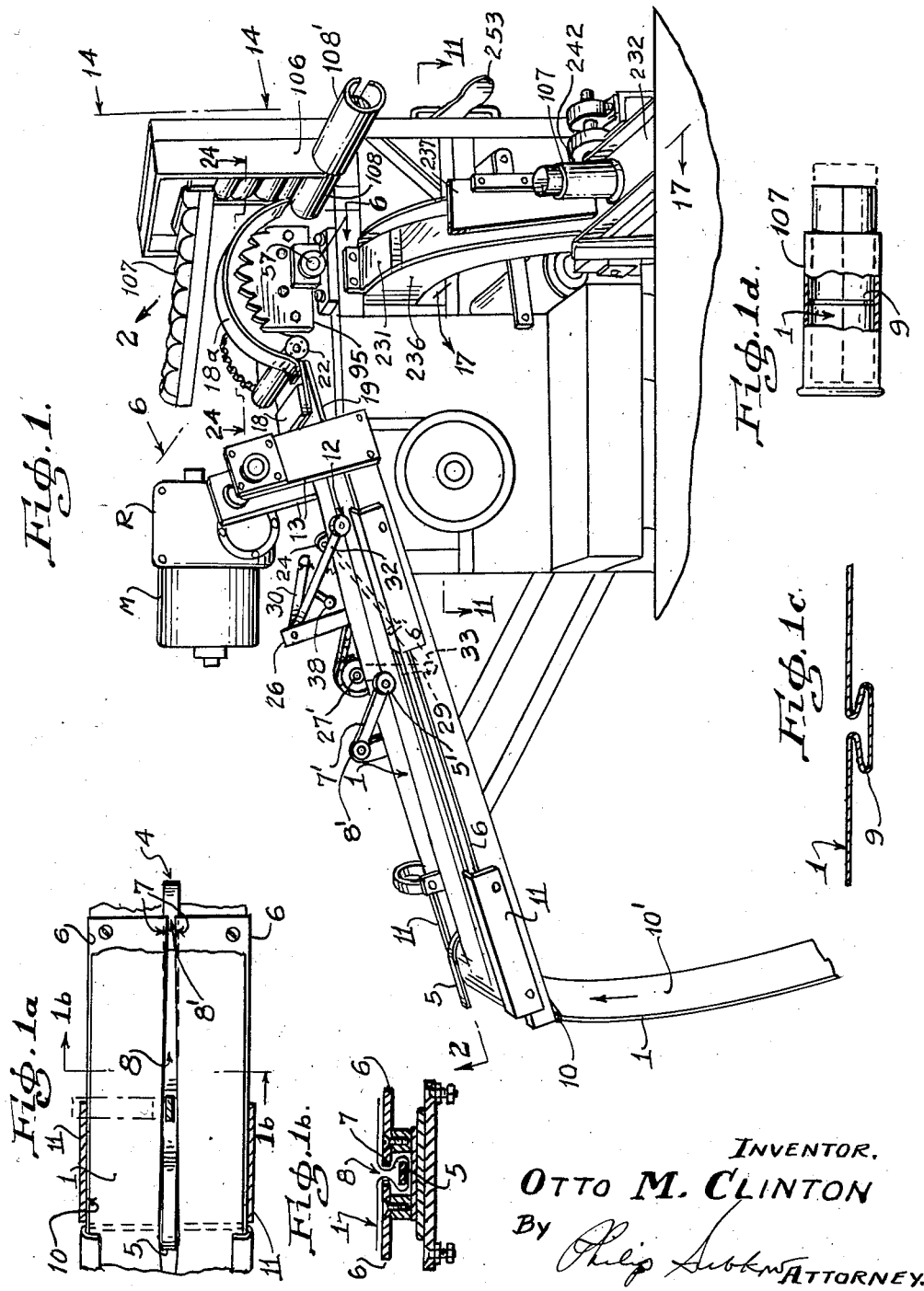
INVENTOR.
OTTO M. CLINTON
By Philip Subkow
ATTORNEY.

Aug. 20, 1957 — O. M. CLINTON — 2,803,175
CARTON LINING MACHINE
Filed April 5, 1954 — 9 Sheets-Sheet 2
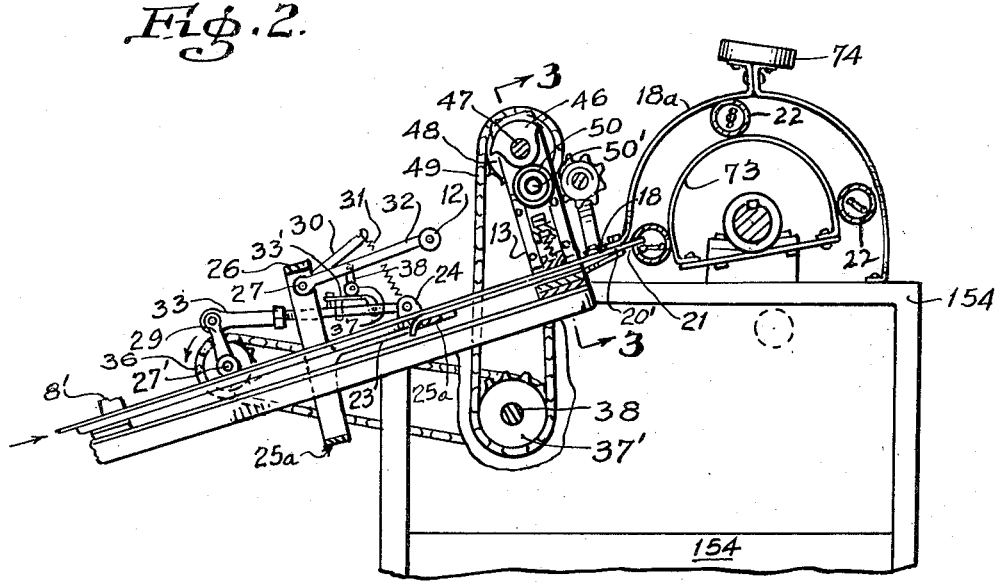
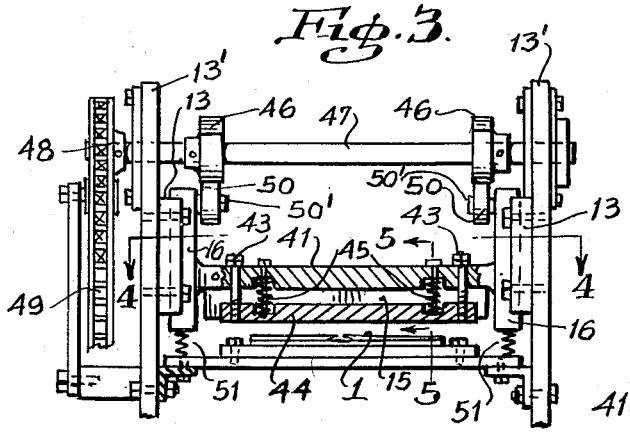
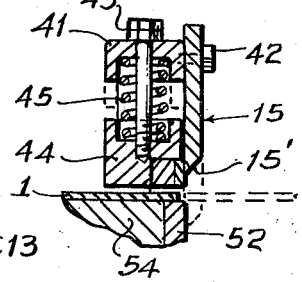
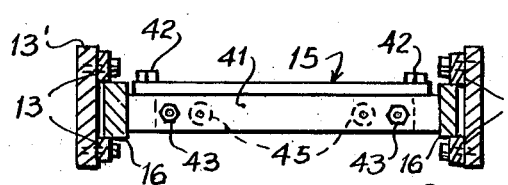
INVENTOR
OTTO M. CLINTON
BY
ATTORNEY.

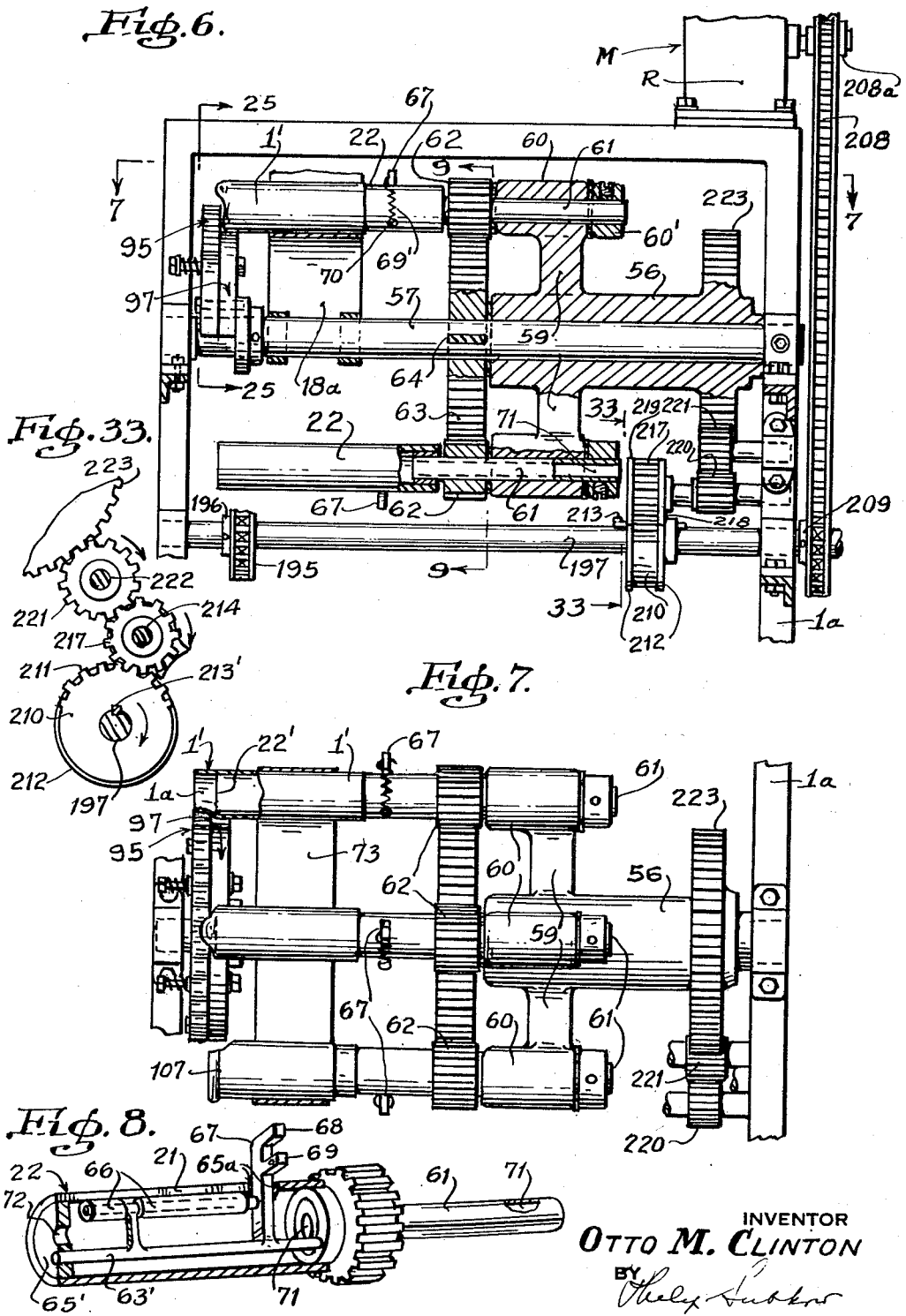

Aug. 20, 1957 O. M. CLINTON 2,803,175
CARTON LINING MACHINE
Filed April 5, 1954 9 Sheets-Sheet 5

INVENTOR.
Otto M. Clinton
By
Philip Subtens
ATTORNEY.

Aug. 20, 1957     O. M. CLINTON     2,803,175
CARTON LINING MACHINE
Filed April 5, 1954     9 Sheets-Sheet 6
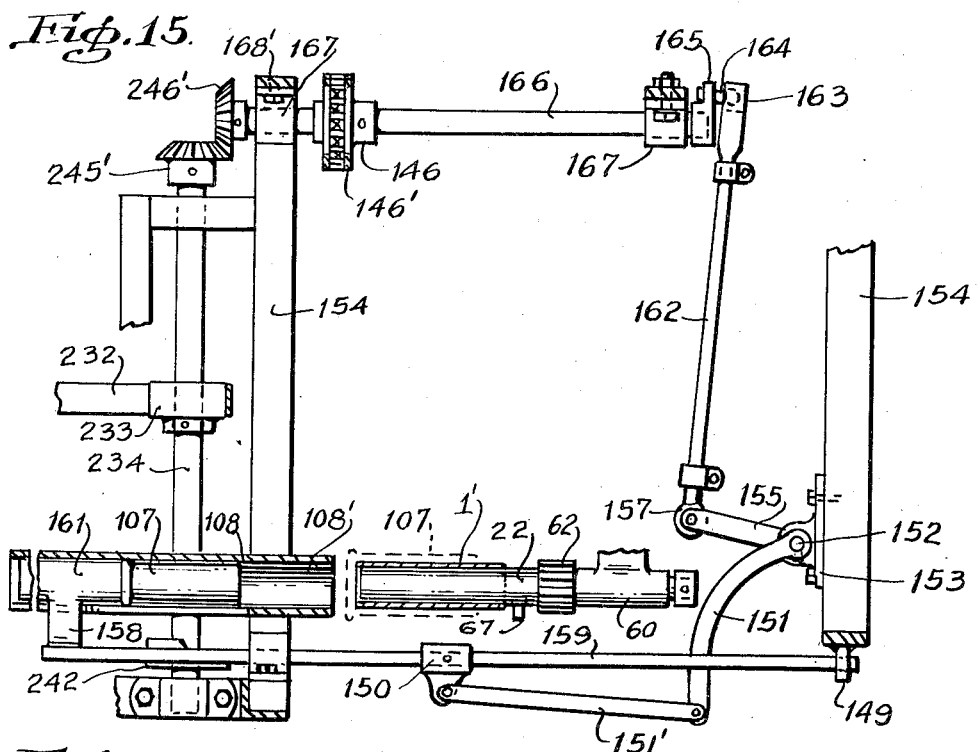
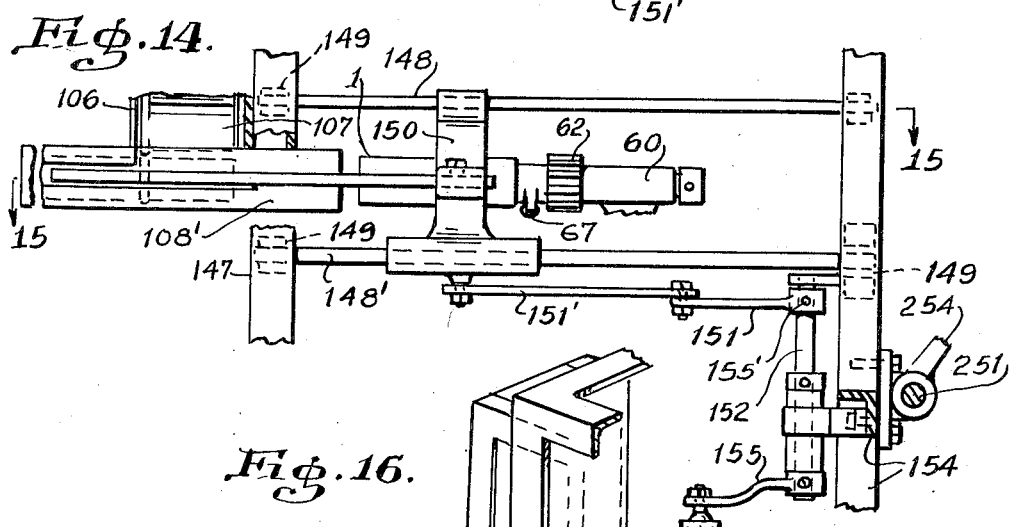
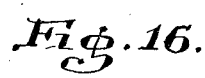
INVENTOR
Otto M. Clinton
BY
ATTORNEY

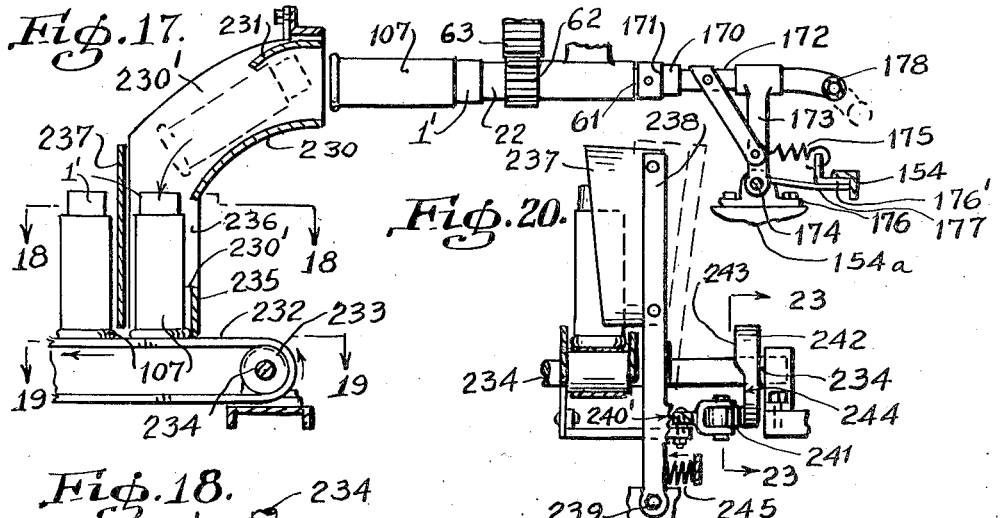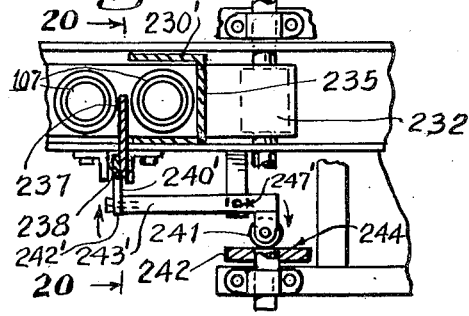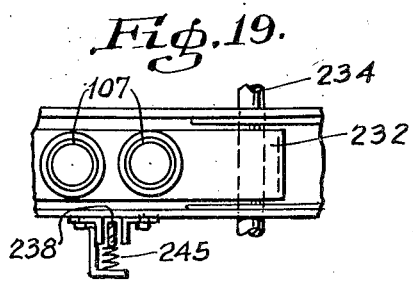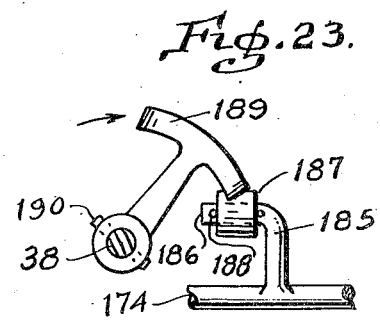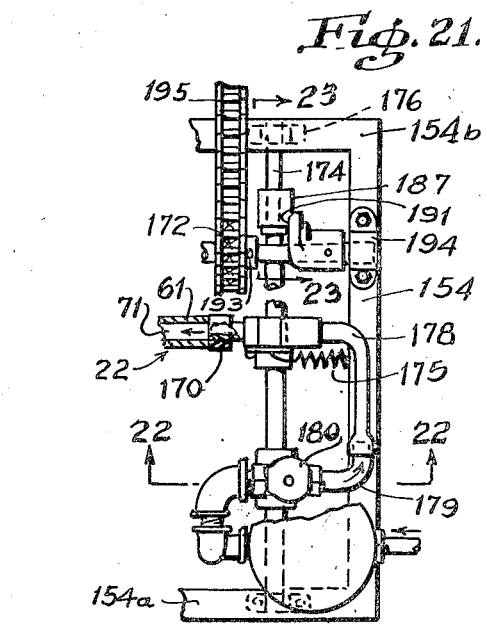

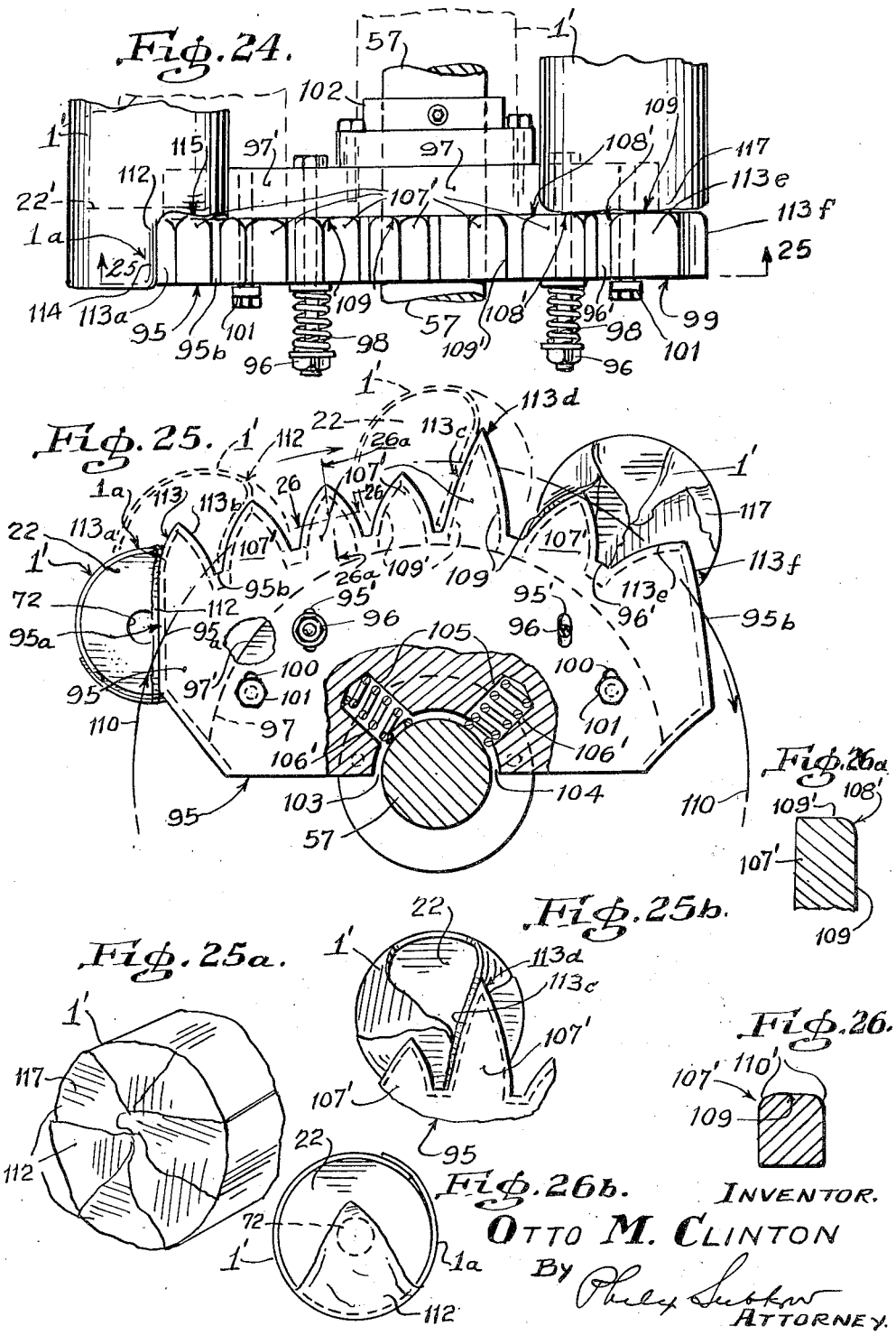

Aug. 20, 1957     O. M. CLINTON     2,803,175
CARTON LINING MACHINE
Filed April 5, 1954     9 Sheets—Sheet 9
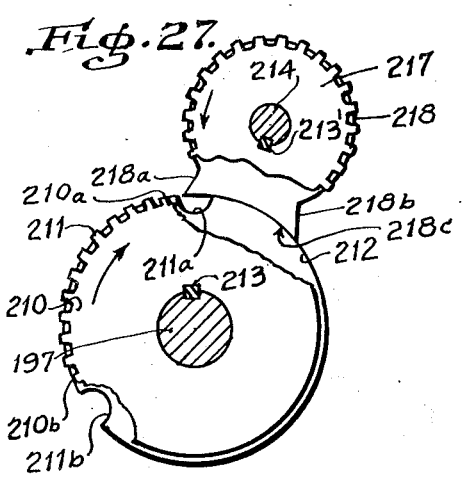
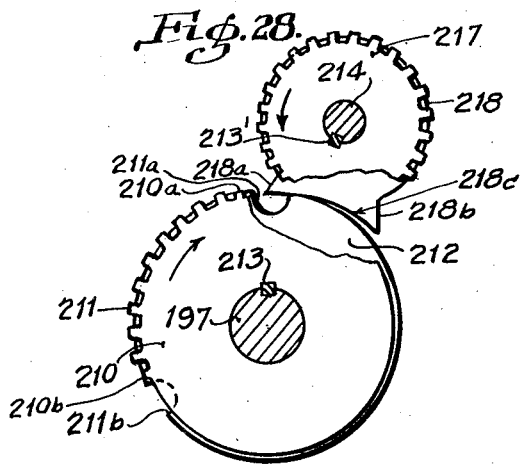
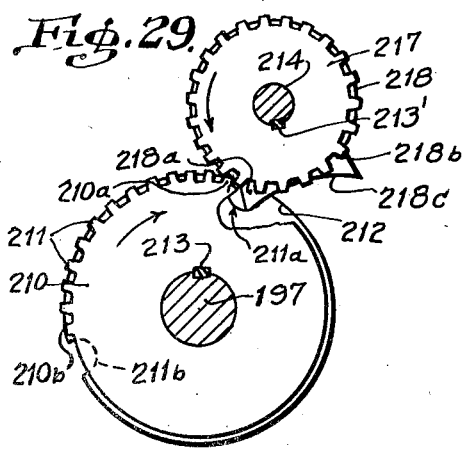
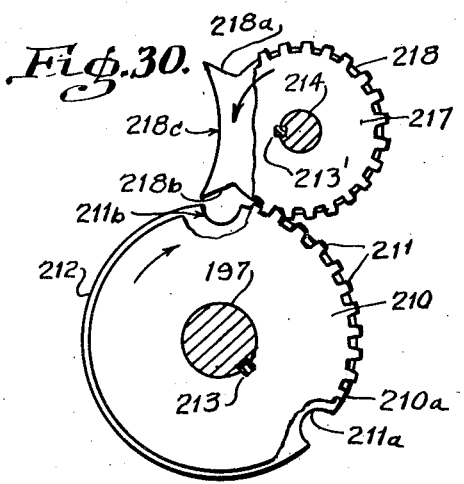
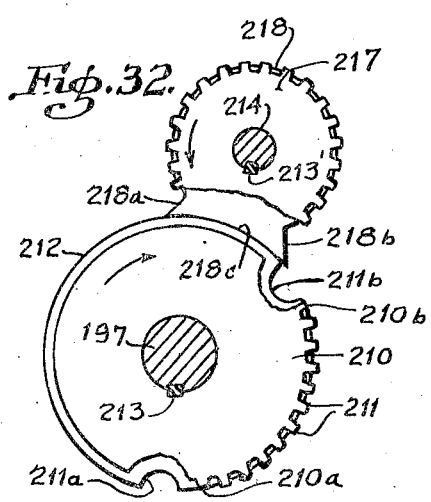
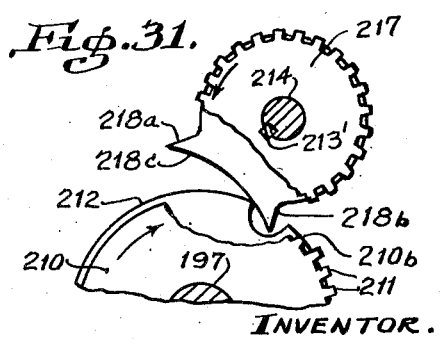
INVENTOR.
OTTO M. CLINTON
BY
ATTORNEY.

United States Patent Office 2,803,175
Patented Aug. 20, 1957

2,803,175

CARTON LINING MACHINE

Otto M. Clinton, Los Angeles, Calif., assignor to Ready-To-Bake Foods Inc., Los Angeles, Calif., a corporation of California Application April 5, 1954, Serial No. 420,896

17 Claims. (Cl. 93—36.01)

This invention relates to a machine for automatically lining containers with sheet material.

For many uses it is desirable to separate the contents of a container from the container wall. This has been accomplished for some purposes by placing the contents in a closed bag and inserting the bag in the container. In other uses, especially in packaging biscuit dough, the material, for example, the dough, is wrapped in a foil laminated paper wrapper and the wrapper overfolded to enclose the dough and the wrapper inserted into the container.

It is an object of my invention to design a machine which will insert into a container, a wrapper so formed that it may receive and enclose and separate the contents of the container from the walls of the container.

While I have designed the machine particularly for use in packaging biscuit dough, the container may be used to package other material. Those skilled in the art will readily recognize that the invention described herein below is readily adaptable to various sizes and configurations of wrapper or containers.

It is a further object of my invention to provide a novel device to line a container with a sheet of material by means of automatically operating mechanism.

It is a further object of my invention to provide novel structure to line a tubular container with a tubular liner of sheet material.

It is a further object of my invention to provide novel means to line a tubular container closed at one end and open at the other with a liner which lines the tubular side wall and closed end of the container.

It is an aim of my invention to afford a device to line a tubular container, by forming a sheet of material into a tube with one end folded over so as to line the cylindrical sides and the closed end of the container.

In the copending application Serial No. 318,490 of William F. Linstedt, filed November 3, 1952, is described a machine for so lining the container automatically. The instant application is an improvement of the machine of the said copending application.

Figure 10:
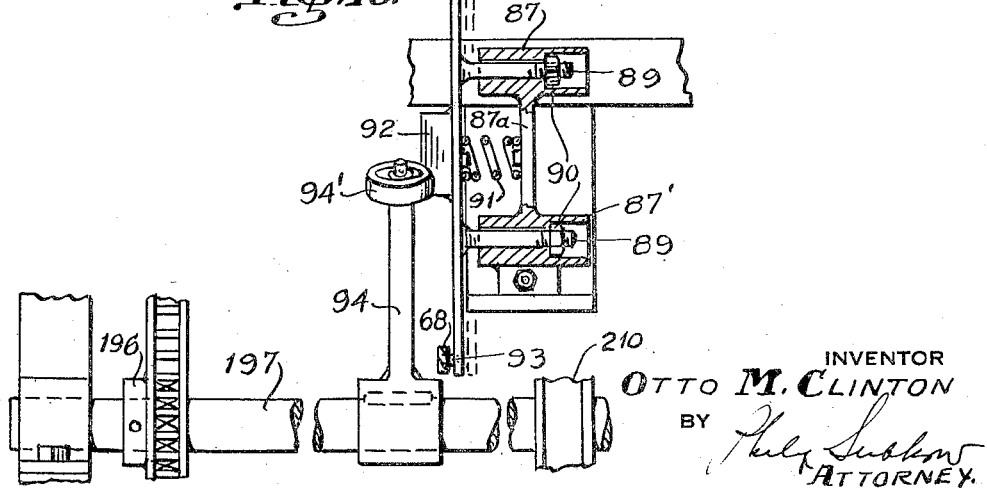
Figure 11:
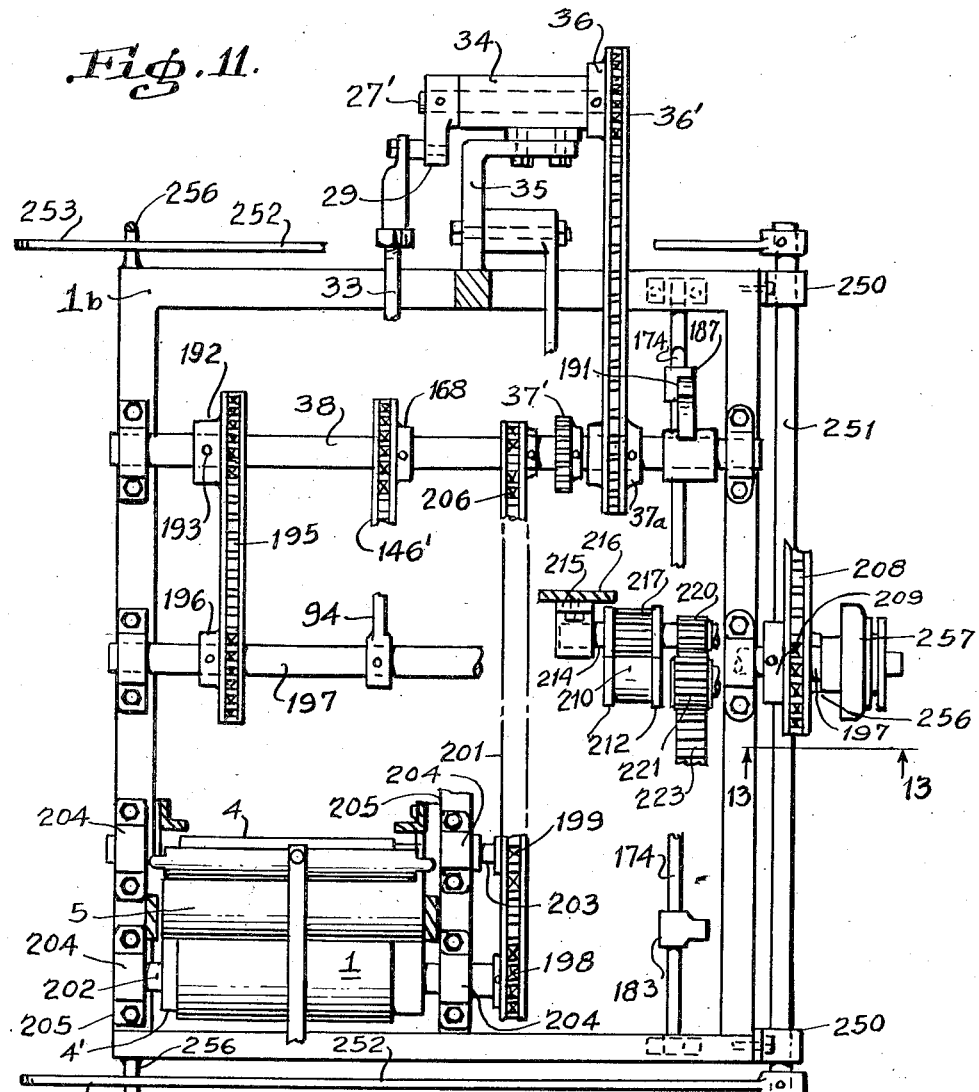
Figures 12, 13:
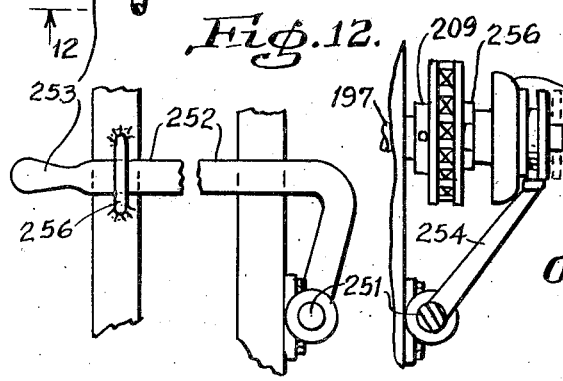

The above objects are accomplished according to the instant invention in the manner described below taken in connection with the accompanying drawings wherein:

Fig. 1 is a view in perspective of the upper part of a preferred embodiment of the machine of this invention;
Fig. 1a is a detail of the device of Fig. 1;
Fig. 1b is a section taken on line 1b—1b of Fig. 1a;
Fig. 1c is a section of a paper sheet overfolded by means of the structure of Figs. 1a and 1b;
Fig. 1d is a schematic view of a carton containing the liner formed as in Fig. 1c;
Fig. 2 is a vertical sectional view on lines 2—2 of Fig. 1;
Fig. 3 is a vertical sectional view on line 3—3 of Fig. 2;
Fig. 4 is a horizontal section on line 4—4 of Fig. 3, looking in the direction of the arrows;
Fig. 5 is a vertical section on line 5—5 of Fig. 3;
Fig. 6 is a vertical section on line 6—6 of Fig. 1;
Fig. 7 is a horizontal section on line 7—7 of Fig. 6;
Fig. 8 is a perspective view of one of the mandrels and its associated parts shown partly in sections;
Fig. 9 is a vertical section on line 9—9 of Fig. 6;
Fig. 10 is a broken vertical section on line 10—10 of Fig. 9;
Fig. 11 is a horizontal section on line 11—11 of Fig. 1;
Fig. 12 is a side elevational fragmentary view taken on line 12—12 of Fig. 11;
Fig. 13 is a partial vertical section on line 13—13 of Fig. 11;
Fig. 14 is a rear elevation on line 14—14 of Fig. 1, looking in the direction of the arrows;
Fig. 15 is a horizontal section on line 15—15 of Fig. 14;
Fig. 16 is a fragmentary perspective view of the guide chute and receiving pocket for the cartons;
Fig. 17 is a section on line 17—17 of Fig. 1;
Fig. 18 is a horizontal section on line 18—18 of Fig. 17;
Fig. 19 is a horizontal section on line 19—19 of Fig. 17;
Fig. 20 is a vertical section on line 20—20 of Fig. 18;
Fig. 21 is a fragmentary section taken on line 11—11 of Fig. 1, showing a detail of the view shown on Fig. 11;
Fig. 22 is a fragmentary view taken on the line 22—22 of Fig. 21;
Fig. 23 is a vertical section taken on line 23—23 of Fig. 21;
Fig. 24 is a plan view taken on line 24—24 of Fig. 1;
Fig. 25 is a view taken on line 25—25 of Fig. 24, showing certain parts in section;
Fig. 25a is an isometric view of the tucked end of a tubular liner according to the invention;
Fig. 25b is a schematic view of the end of a tubular liner when the mandrel is at station 2 of the device;
Fig. 26 is a fragmentary cross-section taken on line 26—26 of Fig. 25, showing a detail of the machine of the invention;
Fig. 26a is a section taken on line 26a—26a of Fig. 25;
Fig. 26b is a schematic illustration showing the first tucking fold made in the tubular liner according to the invention;
Fig. 27 is a fragmentary view, partly schematic, of the intermittent gear and its driven pinion;
Fig. 28 is a view similar to Fig. 27;
Fig. 29 is a view similar to Fig. 28;
Fig. 30 is a view similar to Fig. 29;
Fig. 31 is a view similar to Fig. 30;
Fig. 32 is a view similar to Fig. 31; and
Fig. 33 is a section taken on line 33—33 of Fig. 6.

Paper feed mechanism

As seen in Fig. 1, a sheet of paper 1, which is used to line a tubular container according to the invention, is fed from a roll of paper (not shown) mounted on a spindle (not shown) over an inclined apron 10 (see Figs. 1 and 1a) which acts as an inclined table on which the paper rests and which guides the paper. The paper passes between the guides 11 and proceeds first beneath a blade structure 4 (see Fig. 1b) for continuously overfolding approximately the center portion of the paper sheet in a direction longitudinally of the sheet.

The sheet then passes by means similar to that shown in the above co-pending application under a flattening roller 5' and the non-rotating feed roller 12, and between vertical knife slide guides 13 (see also Figs. 2 and 3) and under the knife 15 mounted on the knife slide 16. A plurality of guide members, similar to those described in the said co-pending application and including guide plates 18 and 19, guide the leading edge 20' of the paper 1 into the slot 21 of the tubular mandrel 22, as will be more fully described below.

The blade structure 4 for overfolding a longitudinal central portion of sheet 1, as seen in Figs. 1a and 1b, includes a central plate or blade 5 and a pair of coplanar spaced wedge plates or blades 6, with the adjacent sides 7 of the plates 6 tapering forwardly. The center plate 5 is a narrow rectangular member located below the slot 8 formed between plates 6, and is in a plane parallel to the plane of plates 6. The paper sheet 1 passes beneath plate 5 and upwardly over the edges of sides 7 of the upper plates 6, the side portions of the sheet passing over the upper surface of plates 6. Since the forward portion of the slot 8 is narrowed down considerably from the rear portion of the slot, it will be seen that the mid-portion of sheet 1 leaving the narrow forward end 8' of the slot 8 will be overfolded as indicated at 9 in Fig. 1c, and the fold is ironed flat by means of the roll 5' rotatably mounted at the lower end of arm 7' fixed at its upper end to the stationary bracket 8' (see Fig. 1). When the sheet is formed into a liner for a carton and inserted therein according to the invention, such overfold is disposed about the inner periphery of the liner, as shown in Fig. 1d, permitting axial expansion of the liner, for example, to the dotted line position shown, due to gases which may be evolved by the contents of the container such as biscuit dough.

The paper feeder mechanism (see Fig. 2) is similar to that described in the above co-pending application and includes the slide 23 carrying an ear 24, the slide being mounted in guideways (not shown). The slide carries a vertical frame 25a on which is positioned a bracket 26 in which is journaled the shaft 27 in suitable bearings. The shaft 27 carries a lever arm 32, on which the non-rotating roller 12 is mounted, and a depending arm 38 carries a roller 37.

Mounted on the shaft 27, suitably secured to the arm 32 as by welding, is an arm 30, to the outer end of which is attached the tension spring 31, connected at its other end to the frame 25a. To the ear 24 is connected the connecting rod 33 which is connected at its other end to the crank arm 29 which is mounted on the short shaft 27'. This shaft (see Fig. 11) is journaled in a bearing 34 mounted on the L-shaped bracket 35 which is fastened to the main frame 1b. Mounted on the connecting rod 33 is a bracket 33' (see Fig. 2). On the outer end of the crank shaft 27' is mounted a driven sprocket 36 revolved by the chain 36' which is driven by the sprocket 37a (see Fig. 11) on shaft 38.

Referring to Figs. 2, 3, and 4, mounted on the stationary brackets 13' are the guideways 13 in which is mounted the knife slide mechanism. The knife slide 16 has the cross member 41 to which is made fast the knife 15 by the screws 42. Suspended from the underside of the lower cross member 41 of knife slide 16 by means of the studs 43 is the pressure foot 44 depressed by the springs 45. The slide 16 is caused to travel in a downward direction by the cams 46 mounted on the shaft 47 driven by the sprocket 48 through the chain 49 meshing with the sprocket 37' on the shaft 38. Cam rolls 50 are held in contact with the periphery of the cams by means of the springs 51. The shaft 47 is mounted in the vertical standard 13'. As the shaft 47 is rotated the cams 46 depress the cam rolls 50 mounted on the studs 50', causing the knife slide 16 to travel downward until the pressure foot 44 iontacts the paper against the plate 54. The knife slide 16 continues to travel downward causing the knife edge 15' to cut the paper against the cutting edge of the lower fixed knife 52. As rotation of shaft 47 is continued and the cam rolls 50 contact the lower portions of the cams 46, the knife 15 is raised by the action of springs 45 carrying with the knife the pressure foot 44. One cycle of revolution of cams 46 cuts off the required length of paper to form one carton liner.

Mandrel machanism

The hub or turret 56 is rotatably mounted upon the stationary shaft 57 (see Figs. 6, 7, and 11). The hub 56 carries the gear 223, and mounted on the hub are four spider arms 59 connected 90° apart to the hub 56. At the outer end of each of the spider arms 59 and integral therewith are the bearing hubs 60 in which the tubular shafts 61 of the mandrel 22 are journaled.

The shafts 61 carry spur gears 62 which act as planetary gears in mesh with the sun gear 63 which is secured to the stationary shaft 57 by means of a key 64. A mandrel 22 is carried at one end thereof on the extension of the shaft 61, i. e., beyond the spur gear 62, and shaft 61 is retained in the bearing 60 by the collar 60'. The opposite end of the mandrel is unsupported and free. The mandrels 22 are hollow and have a slot 21 (see Fig. 8) which extends from the trip slot 65a which is perpendicular to the slot 21, to the free end of the mandrel and through the perforated end closure plate 65'.

The shaft 61 is bored with an interior bore 71 which extends from one end to the other end and communicates with the interior of the mandrel 22; the mandrel is vented through vent hole 72 in the closure plate 65' at the free end of the mandrel.

Paper gripping mechanism

Mounted within the mandrel 22 (see Fig. 8) is the rock shaft 63' pivotally mounted, off center of the shaft 61, at both ends of the mandrel 22 at a point diametrically opposite to the slot 21. The rock shaft 63' carries a roller 66 and a grip lever 67 carrying an end dog 68 and an intermediate ear 69. The lever extends through the transverse slot 65a. The spring 69' is connected to the ear 69 and passes over the exterior surface of the mandrel 22 and is connected to a screw 70 mounted upon the exterior surface of the mandrel 22 (see Fig. 9). All the mandrels 22 are similarly constructed.

Paper winding blades and holding rollers

Mounted on and keyed to the shaft 57, and intermediate the ends of the mandrels 22 (see Figs. 1, 6, and 7). is a steel loop 73 (see Fig. 2) which contacts the surface of the mandrels at the first, second and third stations of the mandrels. The loop does not contact the mandrel at the fourth station. The spring guide 18a is connected to the plate 18 and passes in an upward sweeping loop over and out of contact with the mandrel in the first station and contacts the outer surface of the carton liner 1' just after the mandrel leaves the first station, and continues to contact the mandrel thereafter from the second to the third station. A weight 74 provides downward pressure against guide 18a.

Mounted on the frame 83 (see Fig. 9) adjacent the mandrel at the first station is the bracket 85 on which are mounted hubs 87 and 87'. To the bracket 85 is connected the L-shaped arm 88 by means of the studs 89 (see Fig. 10) provided with the limiting nuts 90. This provides for adjustment of the position of arm 88 in a plane normal to the axis of the mandrels 22. Connecting the hubs 87 and 87' is a member 87a, a spring 91 being interposed between member 87a and the L-shaped arm 88 for the purpose of urging the arm into a normally operative position. Mounted on L-shaped member 88 is a cam roll contacting shoe 92. At the upper end of arm 88 is mounted a pin 86 and at the other end of the arm is a pin 93, the lower portion 88' of arm 88, to which pin 93 is attached, extending outwardly at a small angle to the horizontal. The dog 68 of grip lever 67 attached to the mandrels 22 abuts the pin 86 at station one, so that the liner sheet is permitted to enter the slot 21 of the mandrel and to be gripped by the roller 66 thereof, and abuts the pin 93 at station four so that the sheet on the mandrel is released from gripping relation with the roller 66 of the mandrel.

Mounted for rotation on shaft 197 is an arm 94, at the end of which is a cam roll 94' which during revolution of arm 94 contacts cam shoe 92 on the arm 88, causing the arm 88 to move out of alignment with dogs 68 of the grip levers 67, compressing the spring 91. On continued rotation of arm 94 out of contact with shoe 92, spring 91 urges the arm 88 back into position for engagement once more of pins 96 and 93 with dogs 68. The shaft 197 is caused to revolve by sprocket 196 driven by chain 195 (see Fig. 11).

Tucking mechanism

The tucking mechanism (see Figs. 1, 24, and 25) is an important feature of this invention. This structure is composed of a member 95 having an arcuately shaped outer periphery and a plurality of tooth-like tucking elements spaced adjacent each other on such outer periphery. Member 95 and its tucking elements are mounted so that the end of the mandrel 22 rotates across the inner face of member 95 and such elements to fold the end 1a of the wrapper 1' which extends over the free and unsupported end of the mandrel 22, to form several tucks.

Tucker plate 95 is connected by means of bolts 96 passing through vertical slots 95' of member 95 to an adjacent supporting member 97, bolts 96 being surrounded by springs 98 abutting the ends of the bolts and the outer face 99 of member 95 to provide a spring-biased connection between members 95 and 97. Member 97 also has an arcuately shaped outer periphery 97', the outer periphery 97' of member 97 being located somewhat below outer periphery 96' of member 95. Passing through slots 100 in member 95, which slots are disposed below and farther apart than slots 95', is a pair of threaded fasteners 101, the ends of which are screwed into the adjacent face of member 97. Slots 95' and 100 are vertically disposed. Engagement of the fasteners 101 with the bottom of slots 100 limits the upper position of tucker member 95. It is seen that the slot and bolt structures 100—101 and 95'—96 provide a means for permitting a degree of adjustment of the position of tucking member 95 relative to member 97.

Member 97 is connected by suitable means to a collar 102 in turn attached by suitable means to stationary shaft 57. There is formed along the lower edge of tucking member 95 an almost semi-circular aperture 103 adapted to receive shaft 57. The curvature of aperture 103 is such, however, as to provide a small space 104 between shaft 57 and a portion of the inner periphery of aperture 103. Symmetrically formed in member 95 about the periphery of aperture 103 is a pair of radial pockets 105 each having positioned therein a spring 106', one end of which rests against shaft 57. Springs 106' are normally under compression and form a resilient mount for tucking member 95.

There are seven tooth-like tucking elements 107' on member 95 in the embodiment shown in Figs. 24 and 25, although it will of course be understood that more or less of these elements may be employed as desired to obtain the proper tucking and overflowing of the end portion of the tubular wrapper according to this invention. The inner side 109 of each of the tucking elements 107' is essentially flat and coplanar, elements 107' each being rounded off on its inner side near the apex, as indicated at 108' in Fig. 26a, and preferably also along its inner edges 110', as shown in Fig. 26, to prevent tearing of the paper sheet as it is moved in contact with the elements or teeth 107' in the manner described hereinafter. The tucker teeth 107' are generally similar in shape, although not necessarily the same shape, the height and form of such teeth being designed to obtain best results.

In the preferred embodiment shown in Fig. 25, the first tucker tooth 107' at the left has a curved surface or face 113 formed by two upwardly and inwardly rounded arcuate face portions 113a and 113b intersecting to form an apex at the transverse upper edge 109'. The face portion 113a is a continuation of the left vertical edge 95a of the tucking member 95. The base of the second tooth 107' is separated from that of the first tooth by a short space 95b along the periphery of member 95. The second, third, and fourth tooth elements 107' have substantially the same shaped face as face 113 of the first element 107' to the left. Each of these four teeth 107' are approximately equally spaced from each other and have about the same height, the line joining the apexes of these teeth forming an arc of about the same curvature as the adjacent periphery of member 95.

The fifth tooth 107' from the left is spaced about the same distance from the tooth to its left as the space between each of the preceding teeth. However, the left face 113c of this fifth tooth has only a slight convex curvature and inclines upwardly to meet the other inwardly curved face 113d of this tooth element at an apex which is substantially higher than the apex of any one of the four teeth 107' to the left. The reason for the shape of this fifth tooth will be given hereinafter. The second tooth 107' to the right as seen in Fig. 25 has a shape similar to those of the first four teeth to the left, except that it has a somewhat wider base, and the last tooth to the right has its left face 113e curved similarly to the faces of its adjacent tooth, face 113f of this tooth extending almost vertically downward from its apex and forming the other edge 95b of member 95. The distance between the bases of each of the last three teeth to the right is greater than that between each of the adjacent four teeth 107' to the left. It is noted that the base joining the apex of the last three teeth to the right forms a downwardly extending arc not parallel to the adjacent curved portion of the periphery of member 95.

It has been found that the shape and relationship of the teeth 107' of member 95 shown and described above facilitate the important folding and tucking operation of the invention, and that this structure is considerably simpler than that of the aforementioned Linstedt application.

The tucking member 95 with its above-described associated structure is mounted at station two, as more clearly seen in Fig. 1. When the mandrel rotates and moves from station one to station two, as it approaches member 95 the free end of the mandrel passes along a path in the form of a circular arc 110 centered on the axis of the shaft 57 and concentric with the outer periphery 97' of member 97 (see also Figs. 6 and 7). The free end 22' of mandrel 22 moves in a plane parallel to and closely adjacent but out of contact with the inner sides 109 of tucking elements 107' as seen in Figs. 7, 24 and 26. The path of movement of the mandrel is such that the free end 22' of the mandrel passes closely adjacent but out of contact with the arcuate face 97' of member 97, the distance therefrom being somewhat greater than the thickness of the tubular liner on the mandrel to prevent buckling of the paper on the mandrel adjacent the free end of the liner during the tucking operation.

In rotating and moving clockwise about member 95 as indicated by the arrow in Fig. 25, when the mandrel is in the first position to the left, a portion of the end 1a of the wrapper 1' which extends beyond the free end of the mandrel makes contact with and is flattened against the left face 113a of the first tucker tooth 107' as seen in Fig. 25, and tuck 112 is formed in end 1a of the wrapper, as said end wipes across such first tooth-like element during continued clockwise movement and rotation of the mandrel. In this manner, the extending end of the wrapper is initially brought into engagement with the curved face 113 of the first tooth 107' to cause the engaged portion of the wrapper to bend as seen at 114, and as the mandrel continues to move, the bent portion 114 is bent and folded further, until it is almost in a plane normal to the axis of the mandrel as such bent portion finally engages the inner flat side 115 of the first tooth to make the first tuck 112 just as the mandrel passes beyond such first tooth. The face portion 113a of the first tucker tooth 107', formed as a continuation of the left vertical edge 95a of tucker member 95, produces a large first tuck, the end of which covers the hole 72 in the center of mandrel 22, as seen in Fig. 26b. This assures impingement of air passing through hole 72 directly against the inside of the tucked end of the liner to facilitate subsequent removal of such liner from the mandrel simultaneously with a carton in which it is positioned, as described hereinafter, and prevents escape of such air through the tucked liner portion which may cause the carton to be withdrawn from the mandrel, while leaving the tubular liner on the mandrel.

As the mandrel moves to the next position shown in Fig. 25, a second portion of end 1a of the wrapper adjacent the first tuck extends between the first and second tuck 107' to the left. During continued clockwise rotation of the mandrel, this second portion is first flattened against the left face of the second tooth and is then bent and overfolded into a second adjacent tuck which partially overlaps the first tuck when the wrapper end 1a wipes across the second tooth element 107'.

As the mandrel passes each successive tooth-like element 107', an additional tuck is made in the manner above described by each of such elements, each successive tuck being formed in an adjacent portion of the extending end 1a of the wrapper to form a number of overlapping folded tucks similar to tuck 112.

As the mandrel reaches an intermediate position along the periphery of member 95 adjacent the fourth and fifth tooth elements 107', as shown in Fig. 25, the mandrel is at the second station and at this point stops rotating and moving for an interval. The mandrel then continues to rotate and moves clockwise to the last tooth-like element 107' to the right in the position shown in Fig. 25 to make the last tuck. The height and form of the fifth tooth 107', with its slightly curved face portion 113c aids in properly putting the next tuck in end 1a of the wrapper when the mandrel commences to rotate from its intermediate rest position, as more clearly seen in Fig. 25b. The last tuck is made in that portion of the wrapper end 1a extending between the last two teeth 107' to the right as the mandrel continues to rotate until it is beyond the lower end of edge 95b of tucking member 95. After the mandrel has cleared the right end of tucking member 95, the initially extending end 1a of the wrapper has now been completely tucked to produce an overfolded closure 117 at one end of the tubular wrapper 1', as illustrated in Fig. 25a, which is almost normal to the axis of the tubular wrapper. The mandrel then continues on to station three (see Fig. 9) where the carton is inserted over the mandrel and the tucked liner carried thereby.

Carton loading mechanism:

Mounted on the machine frame is a magazine 106 (see Fig. 1) into which cartons 107 may be loaded in vertical array, with the individual cartons lying horizontally one on top of the other. The bottom of the magazine is open to permit the lowermost tube to drop into the receiving pocket 108'. The pocket 108' is in depth sufficient to receive one carton 107. On the front face of the frame 147, is a pair of parallel rods 148 and 148' carried in brackets 149 (see Figs. 14 and 15). A slide 150 is slidably mounted upon the rods 148 and 148'. The slide is reciprocated by means of the bell crank arm 151 connected to the slide 150 by a connecting rod 151' pivoted on the bell crank 151 and on the slide.

The bell crank 151 is fixed by set screw 155' on the vertical shaft 152 journaled in bearing 153 mounted on frame 154. The lower bell crank arm 155 is connected by a universal joint consisting of a ball and socket connection 157 to the connecting rod 162. The connecting rod 162 carries at its other end the universal ball and socket joint 163 mounted on the crank pin 164 on the crank arm 165. The crank arm is positioned on the inner end of the shaft 166 mounted in the bearings 167 on the frame member 168. The sprocket 146 is mounted on shaft 166, and is provided with a chain 146' meshing with a sprocket 168 on shaft 38. The pusher arm 158 is mounted on the rod 159 which is attached to the slide 150. The arm 158 carries at its outer end a piston-like pusher member 161.

The carton discharge mechanism

The carton 107 is discharged pneumatically by air introduced into the bore 71 of the shaft 61. To accomplish this the annular pad 170 (see Figs. 8, 21, 22 and 23) is pressed against open end 171 of the tubular shaft 61. The pad is connected to the end of a pipe 172 made fast to and carried on the arm 173 which is integral with the shaft 174 mounted in the bearings 176 on the front frame member 154a and rear frame member 154b. The arm 173 is restrained by spring 175 connected to the bracket 176' and to the arm 173. A stop 177 is mounted on frame 154.

The pipe 172 is connected to the hose 178 connected at its other end to the elbow 179 to which is connected a conventional air valve 180.

The valve stem 181 is pushed upward by the stud 182 adjustable on the lever 183, secured to the rock shaft 174 by the pin 184. The rock shaft 174 is provided with the L-shaped cam roll arm 185 having a projecting end 186 upon which is rotatably mounted the cam roll 187 held in place by the pins 188.

On the shaft 38 (see Fig. 23) is mounted a sector type cam 189 fastened to shaft 38 by the pin 190. The cam roll 187 contacts face 191 of the cam 189, which face is parallel to the rock shaft 174. The shaft 38 in the bearings 194 on frame member 154 is rotated by the sprocket 172 made fast to the shaft 38 by the pin 193. The sprocket 192 is driven by the chain 195 meshing with the sprocket 196 on the shaft 197 (see Fig. 11).

Referring to Figs. 17 to 20, inclusive, at station four is mounted a curved chute or guideway 230 open at both ends and adapted to receive a lined carton 107 which is discharged from the end of a mandrel 22 at station four. The chute 230 is provided at its carton receiving end with a deflection plate 231 and at its exit end with a backing plate 235. The exit end of the chute is in the form of a three-sided enclosure including side walls 230' and the backing plate 235. The lower end of the chute is disposed directly above a conveyor belt 232 driven over pulleys such as 233 mounted on a shaft 234. The opening 236 at the delivery end of the chute is of a height somewhat greater than that of a carton to permit it to pass from the delivery end of the conveyor belt. At the open end 236 of the delivery chute is a gate 237 mounted on a bar 238 which is fulcrumed on the pin 239 and caused to rock into and out of registry with opening 236. On an ear 240' located on the bar between the fulcrum pin 239 and the gate 237 is a bracket member having a hub 242' in which is received a shaft 243'. Shaft 243' has mounted at its other end a cam roll 241 which rides on a cam 242 mounted on shaft 234 (see Fig. 15) which is rotated by a miter gear 245' meshing with a mating gear 246' mounted on the outer end of shaft 166. Shaft 243' is pivoted closely adjacent the roller by means of pin 247' passing through shaft 243' and made fast to the frame (see Fig. 15).

The cam is faced with a semi-circular high portion 243 and a semi-circular low portion 244, with which portions the roller 241 is held in contact by spring 245.

The cam is so faced and revolves at such a predetermined speed that the gate remains closed until the carton has settled on the belt, at which time the gate is caused to pivot to one side, as indicated in dotted lines in Fig. 20, to permit the carton to pass through opening 236.

When the carton passes beyond gate 237, the rotation of the cam 242 causes the gate to be swung back to its initial position to restrain forward movement of a succeeding carton received on the conveyor belt at the end of the chute. The function of the gate is to provide a fully enclosed chute into which the carton may be ejected, and to cause the carton to be received on the conveyor in an upright position.

Drive mechanism for machine

*Drive for the paper feed mechanism.*—The main drive is taken from a motor M and speed reducer R mounted on top of the machine (see Figs. 1, 6, and 11), and which drive a sprocket 208a. The sprocket chain 208 meshes with the latter sprocket and drives the sprocket 209 on shaft 197 and is constantly driven, as will be observed.

Paper feed drive

Paper feed rollers 4 and 4' (see Fig. 11) are driven through the sprockets 198 and 199 by means of a sprocket chain 201 which contacts the sprockets 198 and 199 mounted upon the feed roll shafts 202 and 203 journaled in the bearings 204 mounted on the frame 205. Numeral 5 represents a pressure roll bearing against rollers 4 and 4', the paper feeding over the surface of rollers 4 and 4' and under roller 5 to the apron 10 (see Fig. 1). The sprocket chain 201 is driven by a sprocket 206 mounted upon the cross shaft 38. Shaft 38 is rotated by sprocket 192 through chain 195 driven by sprocket 196 on a shaft 197.

The paper feed mechanism is driven from shaft 38. The crank 29 is rotated by sprocket 36 on shaft 27' and the sprocket 36 is rotated by sprocket chain 36' meshed with sprocket 37a on shaft 38.

Intermittent four stop motion drive mechanism

An interrupted gear 210 (see Figs. 6, 11, and 27 to 33) is mounted on shaft 197. The gear carries gear teeth 211 covering a degree of arc which is proportioned to a gear train, as will be described below. On each side of the interrupted gear 210 is a flange 212. The outer diameter of the flange 212 is on the pitch line of the gear 210 and the interrupted gear 210 is keyed, by the key 213, to the shaft 197 as are also the flanges 212. The initial and terminal teeth 210a and 210b of the gear 210 are shortened to the pitch line of the remaining teeth of the gear 210. The stub shaft 214 is journaled in bearings 215 mounted on frame member 216 of the main frame 1a. The stub shaft 214 carries a pinion 217 meshing with the teeth 211 of the interrupted gear 210. On each side of and made fast to the pinion 217 are flanges 218 and 219 all keyed to the stub shaft 214. The flanges 218 and 219, the diameters of which equal the pitch diameter of the teeth of the pinion gear 217, carry a depending concave arcuate portion having terminal wedges 218a and 218b.

The radius of curvature of the concave face 218c is equal to the radius of the periphery of the flange 212, as will be more fully described below.

Referring to Figs. 11, 12 and 13, mounted along one side of the frame in bearings 250 is a shaft 251 adapted for pivotal movement by means of a pair of levers 252 connected at their ends to the opposite extremities of shaft 251. The levers are L-shaped and have a handle 253 at their free ends for manual manipulation, the levers being limited in upward and downward movement by passing through a keeper member 256 mounted on the machine frame. Mounted for pivotal movement at the center of shaft 251 is an arm 254 connected to a clutch member 257 keyed to shaft 197 but axially slidable thereon in response to pivotal movement of arm 254. Downward movement of either clutch lever 252 pivots shaft 251 and arm 254 in a counter-clockwise direction to cause the clutch member 257 to engage a mating clutch member 256 on sprocket 209, which is freely rotatable on shaft 197, causing the motor to drive shaft 197 through sprocket 209 and clutch members 256 and 257. Upward movement of either clutch lever pivots shaft 251 and arm 254 in a clockwise direction, causing clutch members 256 and 257 to disengage and thus stop rotation by the motor of the main drive shaft 197.

The operation of the machine

The operation of the machine will be understood by the construction thereof given below.

The feeding of the paper

The paper 1 (which may be a foil laminated paper or any other flexible sheet material and which is to be used to form the carton liner) is drawn from a web roll (not shown) by the driven feed rolls 4 and 4' against which the paper is frictionally held by the pressure roller 5 (see Fig. 11). The pressure of the roller 5 is regulated by suitable adjusting means disclosed in the above copending application. The rate of feed of the paper over the rolls 4 and 4' is regulated in relation to the rate of feed of sheets of paper to the mandrels, as will be described below. This rate of feed is such that the paper hangs in a slack loop 10' (see Fig. 1) and passes through the side guides 11 which act as gages to center the paper in the paper feed mechanism. The paper is slid over the stationary inclined apron 10 by means of the reciprocating non-rotating feed roller 12. The forward stroke of this roller feeds a length of paper equal to that necessary to form the liner. The paper is pushed by the roller 12 into the mandrel slot 21 during the dwell of the mandrel at the first station. This is accomplished in the following manner:

At the initiation of the dwell period, caused by the operation of the stop motion mechanism, described in detail hereinafter, the crank 29 is in the position almost 180° clockwise of its position shown in Fig. 2, and with the roller 12 pressing against the paper 1 on the apron 10, as illustrated in Fig. 1. As the shaft 197 and the shaft 38 complete their rotation during the dwell period, the crank 29 makes one counter-clockwise revolution from its initial position almost 180° clockwise from its position shown in Fig. 2. During the first half portion of this revolution the slide 23 advances toward the knife 15, and in doing so the slide 23 carries with it the roller arm 32 and the roller 12 in contact with the web of paper. Since the roller 12 does not revolve, the roller drags the paper over the apron 10, at the same time causing the paper to pass beneath plate 5 and around the inner sides 7 and over the surface of the plates 6 to form a longitudinal overfold in the central portion of the liner paper, as previously described. Shaft 47 and cams 46 rotate during this period to cause the pressure foot 44 (see Figs. 3 and 5) to descend and grip the paper at the end of the feeding operation, followed shortly thereupon by the descent of the knife 15 to cut the paper, as described above.

Just as the crank moves to complete its revolution described above, the bracket 33' mounted on the connecting rod 33 comes under the roller 37 and as the roller rides onto the bracket 33' it lifts the arm 32 with the roller 12 away from the paper as shown in Fig. 2. The arm 32 during the remainder of the crank revolution rides in this disengaged position while the slide 23 is withdrawn back to the position shown in Fig. 2. During this portion of the counter-clockwise revolution of the crank 29, the connecting rod 33 makes an increasingly less acute angle with the horizontal, causing the connecting rod 33 and the bracket 33' to rock downward counter-clockwise and causing the arm 32, under the influence of the spring 31, to rock the shaft and arm 32 clockwise. The roller 12 thus descends until it contacts the paper 1 on apron 10 to complete the cycle of operation. During this second half of the revolution of the crank 29, the cams 46 complete the second half of their revolution, causing the knife 15 and pressure foot 44 to be elevated back to the initial starting position shown in Fig. 3.

Paper winding operation

The mandrels 22 are moved to each of the four mandrel positions by rotation of hub 56 and spider arms 59 on the shaft 57 by means of gear 223. The gear 223 is rotated in four 90° rotations. Each 90° rotation occurs during the period that the teeth of the pinion gear 217 are enmeshed with the teeth 211 of the interrupted gear 210. During this rotation the mandrels are advanced from one station to the other and remain stationary, i. e., dwell at such stations during the period that the arcuate face 218c rides over the periphery of the flanges 212, as will be more fully described below (see Figs. 2, 6, 7, 9 and 27 to 33, inc.).

Thus the rotation of the mandrels from one station to the other and the period of dwell at each such station occurs during one complete revolution of the sprocket 209 and of the shafts 38 and 197 (see Fig. 11). As the mandrel approaches station 1, arm 88 is in full line position shown in Fig. 10 with the cam roller 94' out of engagement with the cam shoe 92. As the mandrel arrives at station 1, the dog 68 of the lever 67 of the mandrel intercepts pin 86, and the lever 67 is depressed against the tension of the spring 69', causing the roller 66 to move from gripping position away from the interior surface of the hollow tubular mandrel 22, as is shown in Fig. 9. This permits the roller 12 (see Fig. 2) of the paper feed mechanism to push the leading edge 20 of the paper 1 into the slot 21 and between the interior face of the mandrel and the roller 66. During the dwell period, the continued rotation of the arm 94 brings cam roller 94' into riding engagement with shoe 92 against the action of spring 91 to urge arm 88 to an inoperative position to the right as shown in dotted lines in Fig. 10, and causing the pin 86 to move away from the dog 68 and permitting the spring 69' to snap the roller 66 against the paper to grip the paper against the interior wall of the hollow mandrel.

As the mandrels rotate 90° along gear 223 (see Figs. 2, 6 and 9) to move a mandrel from station one to station two, the planetary gear 62 traveling over the sun gear 63 causes the mandrel to rotate in a clockwise direction viewing Fig. 9. During this rotation the leading edge of the paper is gripped by the gripping roller 66 against the interior wall of mandrel 22 and the paper is held in contact against the outer wall of the mandrel 22 by the steel loop 73 which acts as a wiping blade to smooth the paper against the mandrel. The paper is thus rolled around the mandrel into a convulate tube over the exterior surface of the mandrel 22. As the mandrel 22 approaches the station two it comes into contact with the spring guide 18a which wipes the trailing end 1" of the paper wrapper underneath the guide 18a and over the slot 21 to complete the overlapping convulate wound tube on the mandrel. The loop 73 also contacts the paper to hold it against the exterior surface of the mandrel at this station. The leading edge 20' of the sheet is still gripped against the interior wall of the mandrel by the gripping roller 66.

As the mandrel with the overhanging end 1a of the wrapped sheet approaches station 2, and end 1a comes into contact with the tucking member 95 and the toothlike tucking elements 107' (see Figs. 24 and 25), a series of four successive folding tucks 112, each of which overlaps the previous fold, is formed in the end 1a of the tubular formation on the mandrel by the first four teeth 107' on the left as viewed in Fig. 25, during continued rotation of the mandrel up to the time it comes to rest at station 2, in the manner previously described.

After completion of the dwell period of the mandrel at station 2, the mandrel now makes a second 90° rotation about sun gear 63 to bring the mandrel from station 2 to station 3. In the initial portion of such rotation of the mandrel, three additional overfolded tucks or folds 112 are made in the end 1a of the tubular sheet 1' on the mandrel as a result of the latter wiping successively across the last three tooth-like tucking elements 107' to the right, as viewed in Fig. 10 and previously described. When the mandrel clears the right end of the tucking member 95, the previously extending end 1a of the wrapper 1' is in the form of an overfolded closure disposed over the free end of the mandrel essentially in a plane normal thereto in accordance with the invention (Fig. 25a).

While moving and rotating from station 2 to station 3, the outer surface of the paper rolls over the spring blade 73 and in contact with spring guide 18a and is held against the exterior surface of the mandrel until it approaches station three. The paper on the mandrel is spaced from the spring 73 by a distance somewhat greater than the thickness of the carton which is to be pushed over the mandrel and paper, at station three, as will now be described.

Carton loading operation

As the turret moves from position two to position three the crank 165 (see Figs. 14 and 15) moves the bell crank 151, moving the slide 150 from its extreme outer position at the right to start the pusher 161 to the left, as Fig. 14 and Fig. 15 are viewed. The crank 165 continues its rotation drawing the pusher slide and pusher to the left (see Fig. 15) and by the time the pusher 161 is in carton pushing position the pocket 108' has received a carton from magazine 106 and the carton is in registry with the mandrel at position three. The continued rotation of the shaft 166, completing the rotation of the crank 165, draws the pusher member 161 to the right through the pocket and pushes the carton guided by the pocket and the trough 108' over the wrapper 1' and on the mandrel. Continued rotation of crank 165 withdraws the pusher member 161 to the left, as viewed in Figs. 14 and 15, preparatory to inserting another carton over a succeeding mandrel arriving at station three.

Carton discharge operation

As the mandrel moves into station four (see Fig. 9), the lever 67 of the mandrel is intercepted by pin 93, causing the lever 67 to rock the shaft 63' (see Fig. 8), drawing the gripping roll 66 away from gripping position against the paper on the interior surface of the mandrel.

The continued rotation of shaft 38 during the dwell period at station four, moves the sector cam 189 (see Figs. 21, 22 and 23) against the cam roll 187, causing the shaft 38 to rock the rock shaft 174 and thus to move the lever 173 and the air pad 170 counterclockwise. This brings and presses the pad 170 against the end of the hollow shaft 61 and brings the hose 178 into fluid communication with the hollow bore 71 of the shaft 61. At the same time the lift arm 183 causes the adjustable stud 182 to press against the valve stem 181 to open the valve 180 and to cause compressed air from the tank to generate air pressure inside the hollow mandrel and against the tucked end of the wrapper or liner and the end closure of the carton, through the vent holes 72. The air pressure blows the carton and liner off the mandrel at station four, and the carton is directed into the chute 230. The continued rotation of the shaft 38, completing the revolution of the shaft, draws the sector cam 189 off the roll 187, permitting the shaft 174 to rock clockwise, under the influence of spring 175, withdrawing the valve lift 182 from the valve stem, which thereupon closes, and at the same time withdrawing the pad 170 from the end of the hollow shaft 61. This cycle of the operation for the discharge of the liner and carton occurs during the dwell period of the mandrel at station four.

When the carton is blown off the mandrel at station four with the closed bottom end of the carton forward, it passes downwardly through the curved chute 230 until the bottom of the carton strikes the conveyor belt 232 (see Figs. 17 to 20). At this time the cam roller 241, through the action of spring 245, is riding on the lower portion 244 of cam 242 which is rotating with shaft 234 driven by shaft 38 and the gate 237 is closed, so that the carton received on the conveyor belt lands upright between the backing plate 235 and the gate 237, and is restrained momentarily from moving forward on the conveyor belt by the gate. As the cam 242 continues to rotate and the cam roller 241 moves to the high portion 243 of the cam, this causes the gate 237 to pivot at pin 239 out of registry with opening 236 to the dotted line position shown in Fig. 20, and permits the carton 107 with its tubular liner 1' to proceed past the opening on the conveyor belt 232. Just as the carton clears this opening, the cam 242 has rotated sufficiently farther so that cam roller 241 is once more riding on the low portion 244 of the cam, causing the gate 237 to pivot back into closing position over opening 236. When this takes place, the succeeding carton, blown from the next mandrel reaching station four, is received on the conveyor belt at the bottom of chute 230, and the action as described above is repeated.

*The operation of the stop motion mechanism for the machine*

As shown in Fig. 27, the interrupted gear 210 revolves clockwise in the direction of the arrow. The pinion gear remains stationary while the arcuate face 218c rides on the periphery of the flange 212. When the gear 210 has rotated sufficiently to bring the stub tooth 210a into contact with the gear 217, the pinion is caused to rotate counter-clockwise as the gear 210 rotates clockwise, the rotation of the gear 217 causes the wedge 218a to enter the notch 211a (as shown in Fig. 28). The continued rotation of the gear 217 meshing with gear 210 causes the gear 217 to rotate from the position shown in Fig. 28 to the position shown in Fig. 29. Upon further rotation of the gear 210, the gear 217 is rotated sufficiently so that the wedge 218b approaches the notch 211b, as shown in Fig. 30, and on further rotation the wedge 218b enters the notch 211b. On further rotation the wedge rotates in the notch until the terminal stub tooth 210b leaves the leading tooth of the pinion (see Fig. 31) whereupon the arcuate face rolls into contact with the periphery of the flange 212 (see Fig. 31). This occurs during a 90° rotation of a mandrel about sun gear 63. During the remainder of the revolution of shaft 197 the arcuate face 218c rides on the flange 212 from the position shown in Fig. 32 to that shown in Fig. 27. During this period the mandrels dwell in their stations.

While I have described a particular embodiment of my invention for the purpose of illustration, it should be understood that various modifications and adaptations thereof may be made within the spirit of the invention as set forth in the appended claims.

I claim:

1. A carton lining machine, which comprises means for feeding sheet material to a mandrel, means for rolling said sheet about said mandrel into a tubular formation, said sheet extending beyond the end of said mandrel, an adjustably positionable resiliently mounted tucking member having an arcuately shaped outer periphery and a plurality of outwardly extending curved tooth-like tucking elements spaced from each other about said periphery, said elements each being rounded off on its inner side near the apex thereof and the inner sides of said elements being substantially flat and coplanar, means for rotating and guiding said mandrel so as to bring adjacent portions of that part of the tubular sheet extending beyond the end of the mandrel into engagement with the face and a flat side of successive ones of said tooth-like elements to form a plurality of overlapping folds and tucks at the extending end of said tubular sheet on said mandrel, producing an overfolded closure almost normal to the axis of said mandrel at said end of said tubular formation, a member having an arcuately shaped outer periphery in the form of an arc concentric with the path of movement of said mandrel, said last-named member being mounted adjacent said tucking member and spaced a short distance somewhat greater than the thickness of said tubular sheet from the bottom of said mandrel as it rotates in operative relation with said tucking member, said second-named member preventing buckling of that portion of said tubular sheet adjacent the outwardly extending end of said sheet during said folding and tucking operation, means for inserting a tubular carton having a closed end over said tubular sheet with the tucked end against said closed end, and means to withdraw the carton and said tubular sheet from said mandrel.

2. A carton lining machine, comprising a turret adapted to be rotated intermittently in four steps of 90° each, four equally spaced tubular mandrels on said turret each of said mandrels being rotatably mounted at one end of said mandrel on said turret, with the other end of said mandrel free, each of said mandrels having a longitudinal slot in the wall of said mandrel, said turret moving each mandrel to each of four successive stations, means at the first station for feeding the leading edge of a sheet of material into said slot, with the end of said sheet extending beyond the free end of said mandrel, a gripping element mounted in said mandrel for gripping the leading edge of said sheet in said slot, means at the first station to lift said gripping element from gripping position, means at said first station for moving said gripping element to gripping position when said mandrel is at said first station, means for holding said element in gripping position during the rotation of said turret from the first to the fourth position, means for rotating said mandrel and for winding said sheet about said mandrel into a tubular formation during the rotation of said mandrel, said sheet extending beyond the end of said mandrel, said means including means for rotating said mandrel during the rotation of said turret from the first to the second position, folding tucking means at said second position for tucking the extending end of said tubular sheet about the free end of said mandrel to overfold and close said end of said tubular formation, said folding tucking means comprising a member having a plurality of outwardly extending tucking elements positioned along at least a portion of the periphery of said member, means for pushing a carton closed at one end over said free end of said mandrel and over said sheet on said mandrel when said mandrel is at the third position, means at said fourth position for moving said gripping element from gripping position, and means at said fourth position for removing said carton and said wrapped sheet from said mandrel.

3. A carton lining machine, comprising a turret adapted to be rotated intermittently in four steps of 90° each, four equally spaced tubular mandrels on said turret each of said mandrels being rotatably mounted at one end of said mandrel on said turret, with the other end of said mandrel free, each of said mandrels having a longitudinal slot in the wall of said mandrel, said turret moving each mandrel to each of four successive stations, means at the first station for feeding the leading edge of a sheet of material into said slot, with the end of said sheet extending beyond the free end of said mandrel, a gripping element mounted in said mandrel for gripping the leading edge of said sheet in said slot, means at the first station to lift said gripping element from gripping position, means at said first station for moving said gripping element to gripping position when said mandrel is at said first station, means for holding said element in gripping position during the rotation of said turret from the first to the fourth position, means for rotating said mandrel and for winding said sheet about said mandrel into a tubular formation during the rotation of said mandrel, said sheet extending beyond the end of said mandrel, said means including means for rotating said mandrel during the rotation of said turret from the first to the second position, a tucking member at said second position, said member having an arcuately shaped outer periphery and a plurality of outwardly extending tooth-like elements disposed adjacent each other about said periphery, said member being positioned so that the end of said mandrel passes closely adjacent one side of each of said teeth to bring said extending end of said tubular sheet into engagement with said tooth-like elements to fold and tuck said extending end on said mandrel to overfold and close said end of said tubular formation, means for pushing a carton closed at one end over said free end of said mandrel and over said sheet on said mandrel when said mandrel is at the third position, means at said fourth position for moving said gripping element from gripping position, and means at said fourth position for removing said carton and said wrapped sheet from said mandrel.

4. A carton lining machine, comprising a turret adapted to be rotated intermittently in four steps of 90° each, four equally spaced tubular mandrels on said turret, each of said mandrels being rotatably mounted at one end of said mandrel on said turret, with the other end of said mandrel free, said turret moving each mandrel to each of four successive stations, each of said mandrels having a longitudinal slot in the wall of said mandrel, means at the first station for feeding the leading edge of a sheet of material into said slot, with the end of said sheet extending beyond the free end of said mandrel, a gripping element mounted in said mandrel for gripping the leading edge of said sheet in said slot, means at the first station to lift said gripping element from gripping position, means at said first station for moving said gripping element to gripping position when said mandrel is at said first station, means for holding said element in gripping position during the rotation of said turret from the first to the fourth station of said mandrels, means for rotating said mandrel and for winding said sheet about said mandrel into a tubular formation during the rotation of said mandrel, said sheet extending beyond the end of said mandrel, said means including means for rotating said mandrel during the rotation of said turret from the first to the second station, an adjustably positionable resiliently mounted tucking member at said second station, said member having an arcuately shaped outer periphery and a plurality of outwardly extending curved tooth-like tucking elements spaced adjacent each other about said periphery, the inner sides of said elements being flat and coplanar, said member being disposed so that the end of said mandrel, during rotation thereof as it approaches and leaves said second station, passes closely adjacent said inner sides of said tooth-like elements to bring adjacent portions of that part of the tubular sheet extending beyond the end of the mandrel into engagement with the face and a flat side of successive ones of said tooth-like elements to form a plurality of overlapping folds and tucks at the extending end of said tubular sheet on said mandrel, producing an overfolded closure almost normal to the axis of said mandrel at said end of said tubular formation, means for pushing a carton closed at one end over the free end of said mandrel and said sheet on said mandrel when said mandrel is at the third station, means at said fourth station for moving said gripping element from gripping position, means for introducing air pressure into the interior of said hollow mandrel when said mandrel is at the fourth station, and an air conduit for discharge of said air through the free end of said mandrel to withdraw said carton and said wrapped sheet from said mandrel.

5. A carton lining machine as defined in claim 4, including a member having an arcuately shaped outer periphery in the form of an arc concentric with the path of movement of said mandrel, said last-named member being mounted adjacent said tucking member and spaced a short distance somewhat greater than the thickness of said tubular sheet from the bottom of said mandrel as it rotates in operative relation with said tucking member, said member adjacent said tucking member preventing buckling of that portion of said sheet adjacent the outwardly extending end of said sheet during said folding and tucking operation.

6. A carton lining machine, which comprises means for feeding sheet material to a mandrel, means for rolling said sheet about said mandrel into a tubular formation, said sheet extending beyond the end of said mandrel, folding tucking means for tucking the extending end of said tubular sheet on said mandrel to overfold and close said end of said tubular formation, means for inserting a tubular carton having a closed end over said tubular sheet with the tucked end against said closed end, and means to withdraw the carton and said tubular sheet from said mandrel, conveyor means to receive said carton withdrawn from said mandrel, gate means for properly positioning said carton on said conveyor means and restraining movement of said carton on said conveyor means during such positioning, and means actuated in cooperation with said means to withdraw the carton, to release said gate and permit said carton to be carried away on said conveyor means.

7. A carton lining machine, which comprises means for feeding sheet metal to a mandrel, means for rolling said sheet about said mandrel into a tubular formation, said sheet extending beyond the end of said mandrel, folding tucking means for tucking the extending end of said tubular sheet on said mandrel to overfold and close said end of said tubular formation, means for inserting a tubular carton having a closed end over said tubular sheet with the tucked end against said closed end, and means to withdraw the carton and said tubular sheet from said mandrel, conveyor means to receive said carton withdrawn from said mandrel, means for guiding said carton from said mandrel to said conveyor means and including a gate for properly positioning said carton on said conveyor means and restraining movement of said carton on said conveyor means during such positioning, and means actuated in cooperation with said means to withdraw the carton, to pivot said gate into a non-restraining position and permit said carton to be carried away on said conveyor means.

8. A carton lining machine, which comprises means for feeding sheet material to a mandrel, means for rolling said sheet about said mandrel into a tubular formation, said sheet extending beyond the end of said mandrel, folding tucking means for tucking the extending end of said tubular sheet on said mandrel to overfold and close said end of said tubular formation, means for inserting a tubular carton having a closed end over said tubular sheet with the tucked end against said closed end, and means to withdraw the carton and said tubular sheet from said mandrel, conveyor means to receive said carton withdrawn from said mandrel, a hopper for guiding said carton from said mandrel to said conveyor means, a gate cooperating with said hopper for properly positioning said carton on said conveyor means and restraining movement of said carton on said conveyor means during such positioning, and cam operated means actuated in cooperation with said means to withdraw the carton, to pivot said gate into a non-restraining position and permit said carton to be carried away on said conveyor means.

9. A carton lining machine, which comprises means for feeding sheet material to a mandrel, means for rolling said sheet about said mandrel into a tubular formation, said sheet extending beyond the end of said mandrel, folding tucking means for tucking the extending end of said tubular sheet on said mandrel to overfold and close said end of said tubular formation, said folding tucking means comprising a member having a plurality of outwardly extending tucking elements positioned along at least a portion of the periphery of said member, means for inserting a tubular carton having a closed end over said tubular sheet with the tucked end against said closed end, means to withdraw the carton and said tubular sheet from said mandrel, conveyor means to receive said carton withdrawn from said mandrel, gate means for properly positioning said carton on said conveyor means and restraining movement of said carton on said conveyor means during such positioning, and means actuated in cooperation with said means to withdraw the carton to release said gate and permit said carton to be carried away on said conveyor means.

10. A carton lining machine, which comprises means for feeding sheet material to a mandrel, means for rolling said sheet about said mandrel into a tubular formation, said sheet extending beyond the end of said mandrel, an adjustably positionable resiliently mounted tucking member having an arcuately shaped outer periphery and a plurality of outwardly extending curved tooth-like tucking elements spaced from each other about said periphery, said elements each being rounded off on its inner side near the apex thereof and the inner sides of said elements being substantially flat and coplanar, means for rotating and guiding said mandrel so as to bring adjacent portions of that part of the tubular sheet extending beyond the end of the mandrel into engagement with the face and a flat side of successive ones of said tooth-like elements to form a plurality of overlapping folds and tucks at the extending end of said tubular sheet on said mandrel, producing an overfolded closure almost normal to the axis of said mandrel at said end of said tubular formation, a member having an arcuately shaped outer periphery in the form of an arc concentric with the path of movement of said mandrel, said last-named member being mounted adjacent said tucking member and spaced a short distance somewhat greater than the thickness of said tubular sheet from the bottom of said mandrel as it rotates in operative relation with said tucking member, said second-named member preventing buckling of that portion of said tubular sheet adjacent the outwardly extending end of said sheet during said folding and tucking operation, means for inserting a tubular carton having a closed end over said tubular sheet with the tucked end against said closed end, means to withdraw the carton and said tubular sheet from said mandrel, conveyor means to receive said carton withdrawn from said mandrel, a hopper for guiding said carton from said mandrel to said conveyor means, a gate cooperating with said hopper for properly positioning said carton on said conveyor means and restraining movement of said carton on said conveyor means during such positioning, and cam operated means actuated in cooperation with said means to withdraw the carton to pivot said gate into a non-restraining position and permit said carton to be carried away on said conveyor means.

11. A carton lining machine as defined in claim 4, wherein each of said tooth-like tucking elements is rounded off on its inner side near its apex and also rounded off along its inner edges to prevent tearing of said extending end of said tubular sheet as it is brought into contact with said elements during said folding and tucking operation.

12. A carton lining machine as defined in claim 4, wherein said tucking member consists of seven of said tooth-like tucking elements, each of said elements consisting of a pair of convexly shaped faces intersecting to form an apex, one of the outer faces of at least one of said end elements having a length substantially greater than that of the faces of the intermediate five elements, the fourth element following said one element having a height substantially greater than the others of said elements and having one face of relatively slight curvature in comparison with its other face.

13. A folding tucking device for tucking and overfolding one end of a tubular sheet, which comprises a member having an arcuately shaped outer periphery and a plurality of outwardly extending curved tooth-like elements spaced from each other about said periphery, said elements each being rounded off along the edges of one side near the apex thereof and said one side of said elements being substantially flat and coplanar, said elements having convex outer surfaces, an intermediate one of said tooth-like elements having one curved surface intersected by a surface of relatively slight convex curvature, the height of said intermediate element being greater than the others of said elements.

14. A folding tucking device for tucking and overfolding one end of a tubular sheet, which comprises a member having an arcuately shaped outer periphery and a plurality of outwardly extending curved tooth-like elements spaced from each other about said periphery, one side of each of said elements being substantially flat and coplanar, the height of one of said tooth-like elements being greater than the others of said elements, and a curved member mounted closely adjacent one side of said first member, the curved outer periphery of said member being positioned below and spaced from the outer periphery of said first member at the bases of said tooth-like elements.

15. A carton lining machine, which comprises means for feeding sheet material to a mandrel, means for rolling said sheet about said mandrel into a tubular formation, said sheet extending beyond the end of said mandrel, a tucking member having an arcuately shaped outer periphery and a plurality of outwardly extending curved tooth-like tucking elements spaced from each other about said periphery, an intermediate one of said tooth-like elements having one curved face intersected by a face of relatively slight convex curvature, the height of said intermediate element being greater than the others of said elements, means for rotatively moving said mandrel so as to bring portions of that part of the tubular sheet extending beyond the end of the mandrel into engagement with successive ones of said tooth-like elements to fold and tuck the extending end of said tubular sheet on said mandrel to overfold and close said end of said tubular formation, a curved member mounted adjacent said tucking member and spaced a short distance from the bottom of said mandrel as it rotates in operative relation with said tucking member, said curved member preventing buckling of that portion of said tubular sheet adjacent the outwardly extending end of said sheet during said folding and tucking operation, means for inserting a tubular carton having a closed end over said tubular sheet with the tucked end against said closed end, and means to withdraw the carton and said tubular sheet from said mandrel.

16. A carton lining machine, which comprises means for feeding sheet material to a mandrel, means for rolling said sheet about said mandrel into a tubular formation, said sheet extending beyond the end of said mandrel, a tucking member having an arcuately shaped outer periphery and seven outwardly extending curved tooth-like tucking elements spaced from each other about said periphery, the face of each of said elements being formed by a pair of face sections intersecting at an apex, an intermediate one of said tooth-like elements having one curved face and one substantially straight face, the height of said intermediate element being greater than the others of said elements, means for rotatively moving said mandrel so as to bring portions of that part of the tubular sheet extending beyond the end of the mandrel into engagement with successive ones of said tooth-like elements to fold and tuck the extending end of said tubular sheet on said mandrel to overfold and close said end of said tubular formation, a curved member mounted adjacent said tucking member and spaced a short distance from the bottom of said mandrel as it rotates in operative relation with said tucking member, said curved member preventing buckling of that portion of said tubular sheet adjacent the outwardly extending end of said sheet during said folding and tucking operation, means for inserting a tubular carton having a closed end over said tubular sheet with the tucked end against said closed end, and means to withdraw the carton and said tubular sheet from said mandrel.

17. A carton lining machine, comprising a turret adapted to be rotated successively and intermittently to at least a feeding station, an inserting station and a discharge station, a plurality of equally spaced tubular mandrels on said turret, each of said mandrels being rotatably mounted at one end of said mandrel on said turret, with the other end of said mandrel free, each of said mandrels having a longitudinal slot in the wall of said mnadrel, said turret moving each mandrel to each of said successive stations, means at the feeding station for feeding the leading edge of a sheet of material into said slot, with the end of said sheet extending beyond the free end of said mandrel, a gripping element mounted in said mandrel for gripping the leading edge of said sheet in said slot, means at the first station to lift said gripping element from gripping position before said sheet is fed, means at said first station for moving said gripping element to gripping position after said sheet is fed and while said mandrel is at said first station, means for holding said element in gripping position during the rotation of said turret from the feeding to the discharge station, means for rotating said mandrel and for winding said sheet about said mandrel into a tubular formation during the rotation of said mandrel, said sheet extending beyond the end of said mandrel, said means including means for rotating said mandrel during the rotation of said turret from the feeding toward the inserting position, folding tucking means located between said feeding and inserting stations for tucking the extending end of said tubular sheet about the free end of said mandrel to overfold and close said end of said tubular formation, said folding tucking means comprising a member having a plurality of outwardly extending tucking elements positioned along at least a portion of the periphery of said member, means for pushing a carton closed at one end over said free end of said mandrel and over said sheet on said mandrel when said mandrel is at the inserting position, means at said discharge position for moving said gripping element from gripping position, and means at said discharge position for removing said carton and said wrapped sheet from said mandrel.

References Cited in the file of this patent

UNITED STATES PATENTS

| | | |
|---|---|---|
| 482,153 | Barrett | Sept. 6, 1892 |
| 613,239 | Burt | Nov. 1, 1898 |
| 905,844 | Chesney | Dec. 8, 1908 |
| 1,312,570 | Palmer | Aug. 12, 1919 |
| 2,258,013 | Jurgens et al. | Oct. 7, 1941 |